Figure 1:
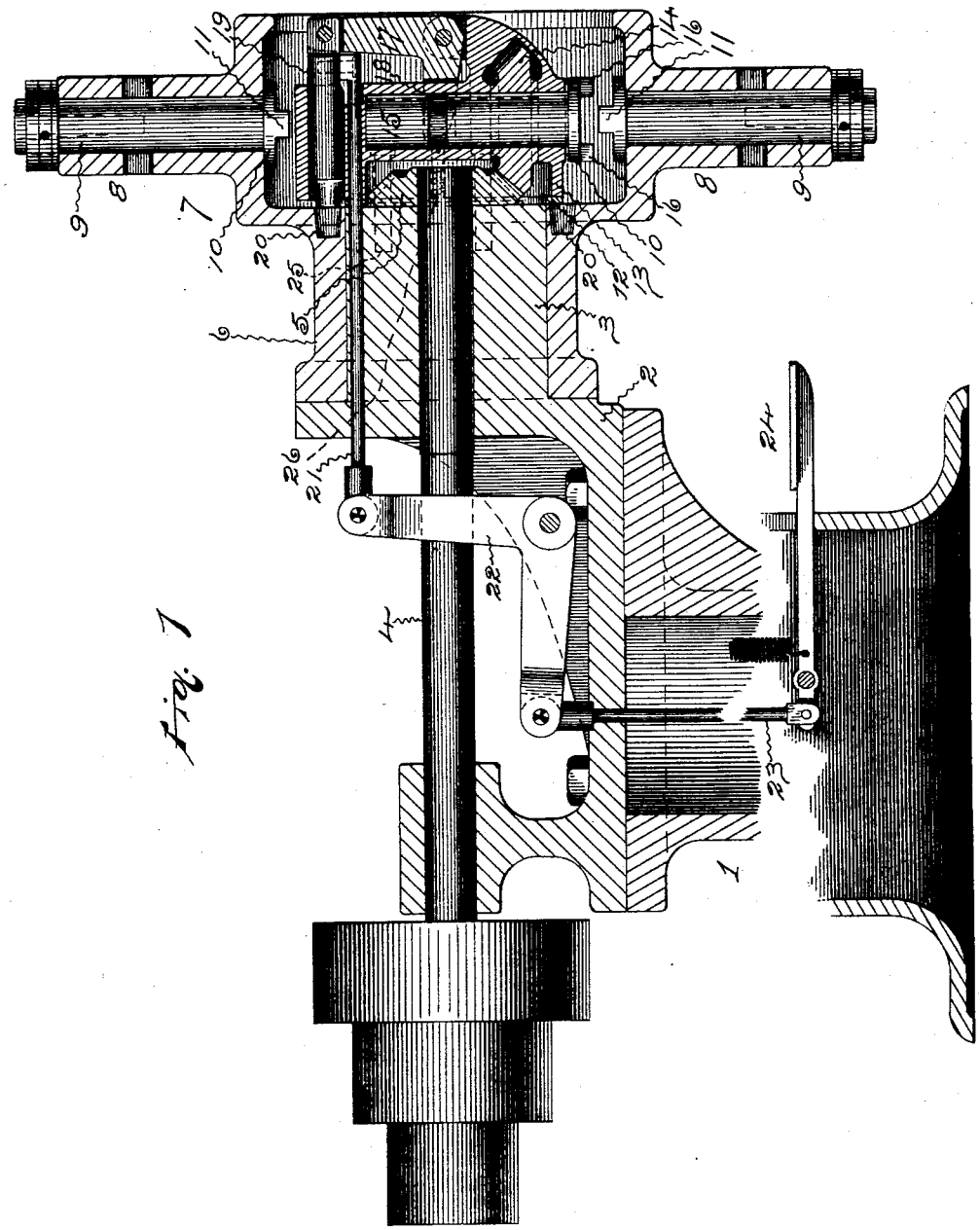

(No Model.)

2 Sheets—Sheet 1.

A. D. QUINT.
TURRET HEAD MACHINE.

No. 520,079. Patented May 22, 1894.

Witnesses:
C. E. Buckland.
E. J. Hyde.

Inventor:
Almond Quint,
by Harry R. Williams
atty.

(No Model.)　　　　　　　A. D. QUINT.　　　　2 Sheets—Sheet 2.
TURRET HEAD MACHINE.
No. 520,079.　　　　　　　Patented May 22, 1894.
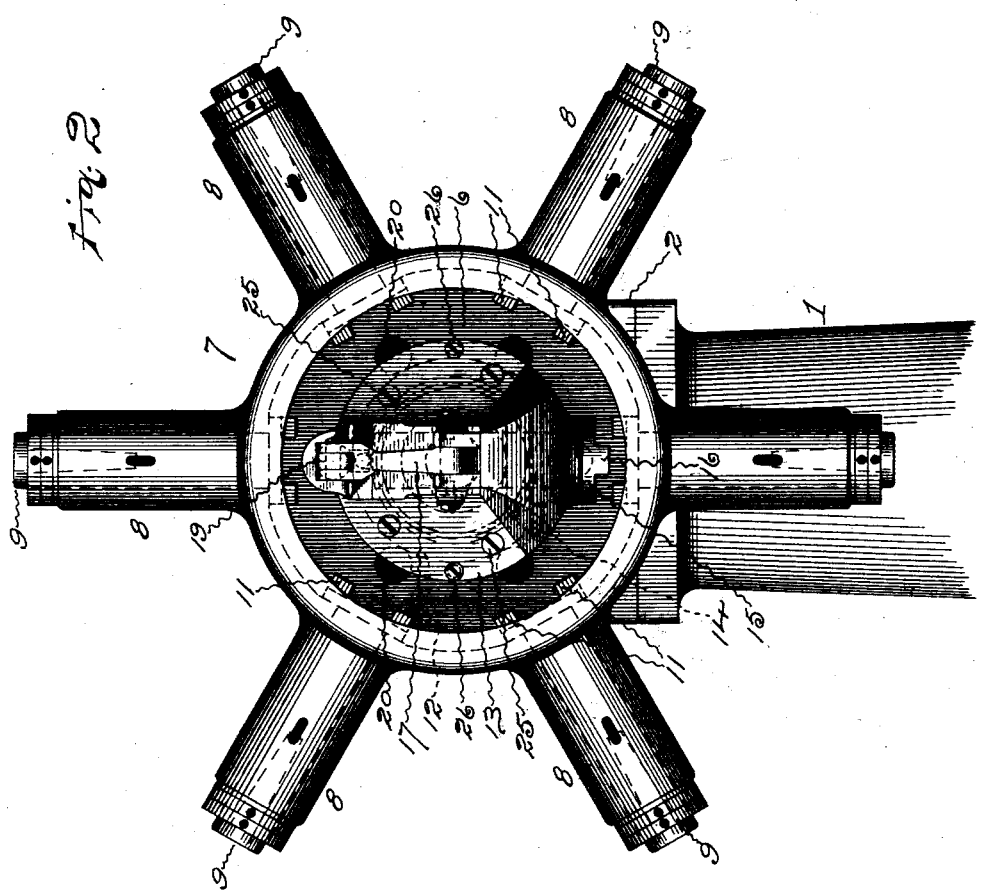
Witnesses:
Inventor:

UNITED STATES PATENT OFFICE.

ALANSON D. QUINT, OF HARTFORD, CONNECTICUT.

TURRET-HEAD MACHINE.

SPECIFICATION forming part of Letters Patent No. 520,079, dated May 22, 1894.

Application filed March 2, 1894. Serial No. 502,094. (No model.)

*To all whom it may concern:*

Be it known that I, ALANSON D. QUINT, a citizen of the United States, residing at Hartford, in the county of Hartford and State of Connecticut, have invented certain new and useful Improvements in Turret-Head Machines, of which the following is a specification.

The invention relates to the class of machine tools that have a movable head with a number of rotary spindles for holding drilling, boring, threading, milling or other wood or metal cutting tools, any one of which tool-holding spindles can be connected with a rapidly rotating driving-spindle by turning the head without stopping the machine, so that the tool it is desired to use can be instantly operated.

The object of the invention is to provide a simple, cheap and easily operated machine tool of this class so constructed that either of the tool-holding spindles can be instantly connected by positive driving mechanism with the rotating driving spindle in order that the tool it is desired to use shall be driven surely and powerfully, and to so arrange the mechanism that the movable head with the various tools shall be locked in correct position before the rotating driving spindle is allowed to engage the spindle of the tool to be driven, and also to insure the disengagement of the spindles before permitting the head to be turned.

Referring to the accompanying drawings:
Figure 1 is a central section of a turret head embodying the invention shown as mounted on the top of an ordinary column, and Fig. 2 is a front view of the head.

To any machine frame, standard or column, 1, is secured a frame, 2, with a circular hub or trunnion, 3, projecting from one side, and in these parts are formed bearings for a shaft, 4, that is provided on one end with driving pulleys and on the other end with a bevel gear, 5. On this trunnion is mounted the hub, 6, of the drum shaped turret head, 7, that has any convenient number of radially projecting tubes or sleeves, 8, in which are loosely supported the tool holding spindles, 9.
These radially extending rotary tool holding spindles have at their outer ends openings or chucks provided with binding and clamping nuts for receiving and grasping the shanks of the tools which it is desired to have ready for use in the machine, while their inner ends have flanges or collars, 10, in the interior of the turret head, that holds the spindles against longitudinal movement, and on these flanges are formed clutching pins or studs, 11, that project inward on opposite sides of the axes of the flanges for engagement with supplemental parts on the end of the driving spindle. After the turret head has been placed in position on the trunnion, a washer or ring, 12, is put against the inner face of the head to take and regulate the longitudinal thrust of the head and over this in the interior of the head by screws or bolts, 25, is fastened the gear-case, 13, screws, 26, passing through the gear-case and bearing against the washer at the end of the trunnion and holding the washer with the proper degree of tension so that it retains the turret head in correct position. In an opening in this gear-case is a bevel gear, 14, located so as to mesh with the gear, 5, on the pulley shaft, 4, at the end of the trunnion. This gear-case also loosely holds a driving spindle, 15, that passes through a perforation in the gear, 14, to which it is splined, so that while having a longitudinal movement independent of the gear the spindle rotates with it. The driving spindle, 15, on its lower end is provided with a flange that has pins or studs, 16, adapted to mesh with the studs, 11, on the ends of the tool holding spindles so that the rotation of the driving spindle will rotate the tool holding spindle with which it is engaged. Pivoted to ears or lugs projecting from a portion of this stationary gear-case in the interior of the head is a bell crank lever, 17, one arm of which is forked and provided with pins that project into the groove, 18, in the driving spindle, 15, that the fork straddles, so that the spindle will be reciprocated when the lever is oscillated. The other arm of this lever is jointed to a pin or bolt, 19, that has a free reciprocation in a perforation in the top of the gear-case as the lever is oscillated so that its end can be passed into or out of the sockets, 20, made in the wall of the turret head, to lock or unlock the movable head. Connected with this locking bolt is a rod, 21, which is jointed to a bell crank lever, 22, that is connected by a rod, 23, with a spring lifted foot lever, 24, pivoted to the base of the tool. When the foot lever is depressed the rod, 21, causes the locking bolt to slide forward so that its end is drawn from the registering and locking socket and allows the turret head to be turned freely, and this movement of the locking bolt oscillates the upper arm of the lever, 17, outward and the lower arm upward, which draws up with it the driving spindle, 15, that is splined to the gear, 14. The locking bolt will not again pass back until the head is turned so that the spindle with the desired tool is in proper position and the correct socket registers with the locking bolt and then, of course, the end of the bolt will pass into the socket and lock the turret head from further movement in the correct position. This backward movement of the locking bolt, which is caused by a spring attached to the treadle rod, oscillates the lever, 17, so that the driving spindle will descend and engage the end of the tool spindle that is in line with it. The upper arm of the lever, 17, is preferably made longer than the lower or inner arm so that when the bolt is moved to unlock the turret head the shorter arm will lift the driving spindle and its clutch from the clutch on the end of the tool-spindle before the head is unlocked so that it cannot be turned until the clutches are disengaged, and when the bolt is unlocked, as the upper arm of this lever is the longer, the end of the bolt must be passed into one of the locking sockets and thus secure the turret head from further movement before the driving spindle clutch will engage a tool spindle clutch, insuring a perfect registering of the clutches before they are allowed to engage.

When in use power is applied to the pulleys and the shaft kept in continuous rotation, and this, of course, continuously revolves both the bevel gears and the spindle that is splined to one of the gears in the driving head. When it is desired to change tools the treadle is depressed and this causes the lever in the head, as above described, to first release the revolving driving spindle clutch from the tool spindle clutch that has been driven and then free the locking bolt from the locking socket at the same movement, leaving the turret head free to be rotated on the trunnion of the frame. When the proper tool comes in position for use the locking bolt passes into the locking and registering socket with which it coincides and first locks the head from further movement in correct position and then the rapidly revolving driving clutch, the rotation of which has not been stopped, engages with and revolves the clutch of the spindle holding the tool to be used. This operation can be proceeded with as often and as rapidly as the operator desires, and any tool can be brought around for use by simply touching the treadle and turning the head, the operation of touching the treadle first releasing the driving spindle and then unlocking the head which is again locked before the driving spindle engages with the spindle having the tool to be used.

This tool is simple, cheap, efficient and durable. A number of different sizes or kinds of tools for drilling, boring, tapping, milling or otherwise cutting wood, metal or other materials can be kept ready for use and either tool in the head can be instantly brought into position without stopping the machine, and driven by positive mechanism, which insures accurate rotation, regular speed and powerful effectiveness. The driving mechanism is absolutely positive so that different heavy cutting tools can be used with the machine and instantly brought into operation on the same center, and the parts which are located in the interior of the head and out of the way of damage and wear are so arranged that the head cannot be moved when a tool spindle is engaged and being driven, or a tool spindle cannot be engaged unless the head is in the correct position. This permits a wide range of work to be accomplished by a simple tool with a great saving of labor and without any danger of damaging the parts when the moving and stationary spindles are engaged or disengaged.

I claim as my invention—

1. A turret head machine having a support with a rotatable shaft bearing a gear, a gear in mesh with the former gear, a driving spindle rotatably connected with the latter gear and adapted to engage tool holding spindles, a turret head movably attached to the support, and rotatable tool holding spindles borne by the turret head and adapted to be engaged by the driving spindle when the turret head is turned to the correct position, substantially as specified.

2. A turret head machine having a support with a rotatable shaft bearing a gear, a gear in mesh with the former gear, a reciprocating driving spindle rotatably connected with the latter gear and adapted to engage tool holding spindles, a turret head movably attached to the support, and rotatable tool holding spindles borne by the turret head and adapted to be engaged by the driving spindle when the turret head is turned to the correct position, substantially as specified.

3. A turret head machine having a support with a rotatable shaft, a driving spindle driven from said shaft, a turret head movably attached to the support, tool holding spindles borne by the turret head, and mechanism for positively engaging the driving spindle with the tool holding spindles, substantially as specified.

4. A turret head machine having a support with a rotatable shaft, a driving spindle driven from said shaft, a turret head movably attached to the support, tool holding spindles borne by the turret head, and a locking mechanism adapted to lock and unlock the turret head, substantially as specified.

5. A turret head machine having a support with a rotatable shaft, a driving spindle driven from said shaft, a turret head movably attached to the support, tool holding spindles borne by the turret head, and a locking mechanism adapted to lock and unlock the turret head and also engage and disengage the driving and tool spindles, substantially as specified.

6. A turret head machine having a support with a rotatable shaft, a longitudinally reciprocating driving spindle driven from said shaft, a turret head movably attached to the support, tool holding spindles borne by the turret head, and a locking mechanism adapted to lock and unlock the turret head and also to reciprocate the driving spindle, substantially as specified.

7. A turret head machine having a support with a rotatable shaft, a driving spindle driven from said shaft, a turret head movably attached to the support, tool holding spindles borne by the turret head, and a locking mechanism that locks and unlocks the turret head and engages and disengages the driving and tool spindles, said locking mechanism being arranged to lock the turret head before engaging the driving and tool spindles, substantially as specified.

8. A turret head machine having a support with a rotatable shaft, a driving spindle driven from said shaft, a turret head movably attached to the support, tool holding spindles borne by the turret head, a bolt held by the support and adapted to pass into sockets in the turret head, and a lever connecting with the locking bolt and also with the driving spindle, the oscillation of which lever moves both the bolt and the spindle, substantially as specified.

9. A turret head machine having a support with a rotatable shaft, a driving spindle driven from said shaft, a turret head movably attached to the support, tool holding spindles borne by the turret head, and a bell crank lever, the longer arm of which is connected with the locking bolt and the shorter arm with the driving spindle, substantially as specified.

10. A turret head machine having a support with a rotatable shaft, a rotary and reciprocating driving spindle driven from said shaft, a turret head movably attached to the support, tool holding spindles borne by the turret head, a reciprocating bolt held by the support, and a lever pivoted to the support and connected with the reciprocating locking bolt and also with the reciprocating driving spindle, substantially as specified.

11. A turret head machine having a support with a rotatable shaft, a bevel gear on the end of said shaft meshing with a bevel gear held by a part secured to the support, a reciprocating driving spindle splined to the latter bevel gear, a turret head movably attached to the support, tool holding spindles borne by the turret head, and a lever pivoted to a part secured to the support, said lever being connected at one end with a reciprocating locking bolt and at the other end with the reciprocating driving spindle, substantially as specified.

12. A turret head machine having a support with a rotatable shaft bearing a bevel gear in mesh with a bevel gear held by a part of the support, a driving shaft splined to the latter bevel gear and having a positive clutch upon its lower end, a turret head movably attached to the support, drill holding spindles borne by the turret head, said spindles having positive clutches on their inner ends, and a lever for reciprocating the driving spindle into and out of engagement with either of the tool holding spindles, substantially as specified.

ALANSON D. QUINT.

Witnesses:
H. R. WILLIAMS,
C. E. BUCKLAND.